United States Patent
Yan et al.

(10) Patent No.: US 12,511,932 B2
(45) Date of Patent: Dec. 30, 2025

(54) AUTHENTICATION SYSTEM USING OBJECT FINGERPRINTING

(71) Applicant: eBay Inc., San Jose, CA (US)

(72) Inventors: Bo Yan, La Jolla, CA (US); Raghavendra Rao Chitradurga Vijayendra, Austin, TX (US)

(73) Assignee: EBAY INC., San Jose, CA (US)

( * ) Notice: Subject to any disclaimer, the term of this patent is extended or adjusted under 35 U.S.C. 154(b) by 193 days.

(21) Appl. No.: 18/207,650

(22) Filed: Jun. 8, 2023

(65) Prior Publication Data
US 2024/0412233 A1    Dec. 12, 2024

(51) Int. Cl.
  *G06V 40/12*   (2022.01)
  *G06Q 30/018*  (2023.01)
  *G06V 10/74*   (2022.01)
  *G06V 10/82*   (2022.01)

(52) U.S. Cl.
  CPC ..... *G06V 40/1347* (2022.01); *G06Q 30/0185* (2013.01); *G06V 10/761* (2022.01); *G06V 10/82* (2022.01)

(58) Field of Classification Search
  CPC .. G06Q 30/0185; G06V 10/761; G06V 10/82; G06V 10/764; G06V 40/12–1394
  See application file for complete search history.

(56) References Cited

U.S. PATENT DOCUMENTS

| | | |
|---|---|---|
| 8,908,920 B2 | 12/2014 | Wood et al. |
| 9,336,459 B2 | 5/2016 | Cordova-Diba et al. |
| 10,176,198 B1 | 1/2019 | Dhua et al. |
| 10,275,820 B2 | 4/2019 | Guo et al. |
| 2017/0236183 A1 | 8/2017 | Klein et al. |
| 2021/0191969 A1 | 6/2021 | Malkosh et al. |
| 2021/0279441 A1* | 9/2021 | Park .................. G06V 40/1388 |

(Continued)

FOREIGN PATENT DOCUMENTS

| | | |
|---|---|---|
| WO | 2021179157 | 9/2021 |

OTHER PUBLICATIONS

"Smile Best Who Smile Last", [Online]. Retrieved from the Internet: https: www.kaggle.com code huafengmai222 smile-best-who-smile-last, (2022), 1 pg.

(Continued)

*Primary Examiner* — Premal R Patel
(74) *Attorney, Agent, or Firm* — SCHWEGMAN LUNDBERG & WOESSNER, P.A.

(57) ABSTRACT

Systems and methods are directed to authenticating items using object fingerprinting and deep learning. A system extracts visual features from an image of the item to be authenticated. Using the visual features, the system performs prefiltering by comparing the visual features from the image of the item to visual features of an image of an authentic item that is same or similar to the item. Based on the prefiltering analysis indicating that the visual features from the image of the item matches the visual features from the image of the authentic item, deep learning analysis is performed by applying the image of the item and at least two other images including the image of the authentic item to a convolutional Siamese neural network (SNN). The convolutional SNN generates image embeddings used to derive similarity scores. Based on the similarity scores, a determination is made whether the item is authentic.

20 Claims, 8 Drawing Sheets

(56) References Cited

U.S. PATENT DOCUMENTS

| | | | |
|---|---|---|---|
| 2022/0351215 A1 | 11/2022 | Ramasubramanian et al. | |
| 2023/0045850 A1* | 2/2023 | Sammoura | G06V 10/751 |
| 2023/0274574 A1* | 8/2023 | Li | G06V 40/1365 |
| | | | 382/124 |
| 2023/0326237 A1* | 10/2023 | Chiang | G06V 40/1347 |

OTHER PUBLICATIONS

"kairess fingerprint recognition", [Online]. Retrieved from the Internet: https: github.com kairess fingerprint_recognition, (2025), 3 pgs.

Alam, Nur A, "An Intelligent System for Automatic Fingerprint Identification Using Feature Fusion by Gabor Filter and Deep Learning", Science Direct Computers and Electrical Engineering vol. 95, (Oct. 2021), 16 pgs.

Daoud, Eduard, "Enhancing Fake Product Detection Using Deep Learning Object Detection Models", International Journal On Computer Science and Information Systems vol. 15 Number 1, (2019), 12 pgs.

Gonzalez Compean, Jose Luis, "A Blockchain and Fingerprinting Traceability Method for Digital Product Lifecycle Management", Sensors vol. 22 Issue 21, (Nov. 2022), 23 pgs.

Rajini, N. Hema, "Image Forgery Identification Using Convolution Neural Network", International Journal of Recent Technology and Engineering vol. 8 Issue 1S4, (Jun. 2019), 10 pgs.

Xing, Jin Zhu, "Fingerprint TF", [Online]. Retrieved from the Internet: https: github.com JinZhuXing Fingerprint_TF, (2022), 3 pgs.

\* cited by examiner

AUTHENTICATION SYSTEM USING OBJECT FINGERPRINTING

TECHNICAL FIELD

The subject matter disclosed herein generally relates to authenticating items. Specifically, the present disclosure addresses systems and methods that determines an authenticity of an item based on object fingerprinting that uses deep learning.

BACKGROUND

Sellers typically are hesitant to sell luxury items if they are not certain that they will receive the same item back in case of a return and not a fake version of the item. This level of trust is extremely important for categories such as jewelry, watches, and collectibles (e.g., trading cards, comic books). With respect to collectible items such as trading cards, there is no authentication process via image classification. Instead, most authentication processes involve the use of quick response (QR) codes or digital certificates (e.g., non-fungible tokens).

DETAILED DESCRIPTION

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Example embodiments address the technical problem of authenticating items in a computationally efficient manner. Because deep learning analysis is resource intensive, example systems perform prefiltering analysis based on visual features of images of the items to be authenticated. The prefiltering quickly and efficiently filters out obvious unauthentic items, which are then not subject to deep learning analysis. In one example, the prefiltering analysis comprises a series of matching analysis whereby if an item does not satisfy a matching threshold of a first or second matching analysis, it is deemed unauthentic (i.e., fake) and the authentication process stops prior to deep learning. Conversely, if the first or second matching analysis does satisfy a corresponding threshold, then the authentication process moves on to a next matching analysis in the series.

Once filtered, any remaining items can then be analyzed using deep learning. In example embodiments, the deep learning uses a convolutional Siamese neural network (SNN) comprising a plurality of convolutional neural networks (CNNs) and embedding models. Results from the SNN are then applied to a triplet loss that results in similarity scores. A determination of authenticity is then made based on the similarity scores.

As a result of the prefiltering, one or more of the methodologies described herein may obviate a need for certain efforts or computing resources that otherwise would be involved in applying deep learning analysis to all items to be authenticated rather than a filtered subset. Examples of such computing resources include processor cycles, network traffic, memory usage, data storage capacity, power consumption, network bandwidth, and cooling capacity.

Figure 1:
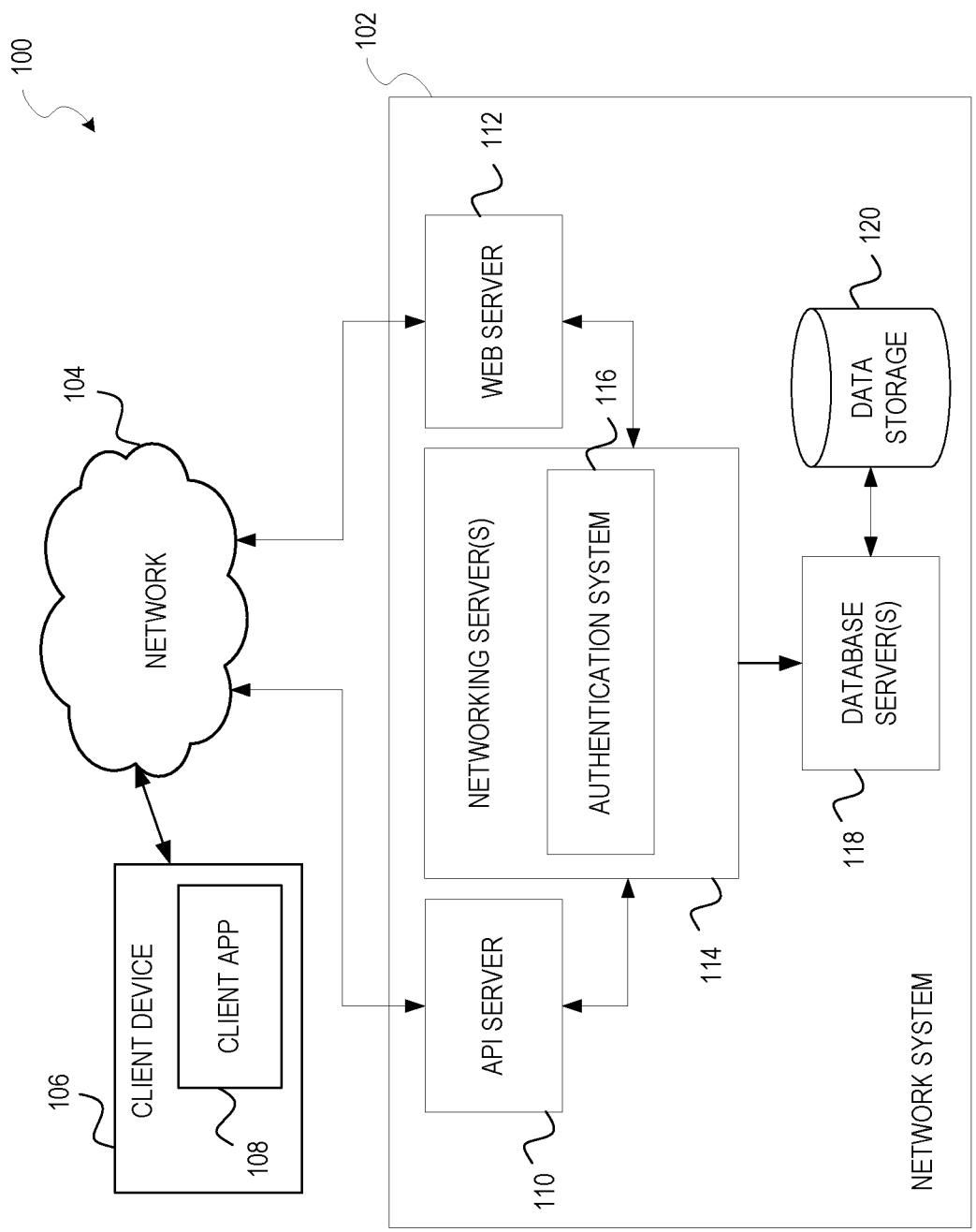
FIG. 1 is a diagram illustrating an example network environment suitable for authenticating an item based on object fingerprinting using deep learning, according to example embodiments.

FIG. 1 is a diagram illustrating an example network environment 100 suitable for authenticating an item based on object fingerprinting using deep learning, according to example embodiments. A network system 102 provides server-side functionality via a communication network 104 (e.g., the Internet, wireless network, cellular network, or a Wide Area Network (WAN)) to a client device 106. The network system 102 is configured to authenticate items by first filtering out obvious unauthentic items based on visual features before performing machine-learning analysis (e.g., deep learning analysis) on items that satisfy the filtering, as will be discussed in more detail below.

In various cases, the client device 106 is a device associated with a user account of a seller of the network system 102 that wants to make sure that an authentic item they are selling is the same item that gets returned. In other cases, the client device 106 is a device associated with a user account of a buyer of the network system 102 that wants to ensure that an item that they purchased is authentic.

The client device 106 comprises one or more client applications 108 that communicate with the network system 102 for added functionality. For example, the client application 108 may be a local version of an application or component of the network system 102. Alternatively, the client application 108 exchanges data with one or more corresponding components/applications at the network system 102. The client application 108 may be provided by the network system 102 and/or downloaded to the client device 106.

In one embodiment, the client application 108 comprises an authentication component that exchanges data with the network system 102. The client application 108 works with or triggers a camera component or application operating on or associated with the client device 106 to capture one or more images of an item to be authenticated (also referred to herein as "test item") and transmits the image(s) to the network system 102 for authentication. In return, the client application 108 receives an indication of whether the item is authentic.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 may comprise, but are not limited to, a smartphone, tablet, laptop, multi-processor systems, microprocessor-based or programmable consumer electronics, game consoles, set-top boxes, a server, or any other communication device that can access the network system 102. The client device 106 may comprise a display module (not shown) to display information (e.g., in the form of user interfaces) including the indication of whether an item is authentic. The client device 106 can be operated by a human user and/or a machine user.

Turning specifically to the network system 102, an application programing interface (API) server 110 and a web server 112 are coupled to, and provide programmatic and web interfaces respectively to, one or more networking servers 114. The networking server(s) 114 host various systems including an authentication system 116, which comprises a plurality of components and which can be embodied as hardware, software, firmware, or any combination thereof. The authentication system 116 will be discussed in more detail in connection with FIG. 2.

The networking server(s) 114 are, in turn, coupled to one or more database servers 118 that facilitate access to one or more storage repositories or data storage 120. The data storage 120 is a storage device storing, for example, user accounts (e.g., profiles associated with a buyer or seller) and images of authentic items.

Any of the systems, servers, data storage, or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one system may, in alternative examples, be embodied in a different system. For example, any number of client devices 106 or data storage 120 may be embodied within the network environment 100. While only a single network system 102 is shown, alternatively, more than one network system 102 can be included (e.g., localized to a particular region).

Figure 2:
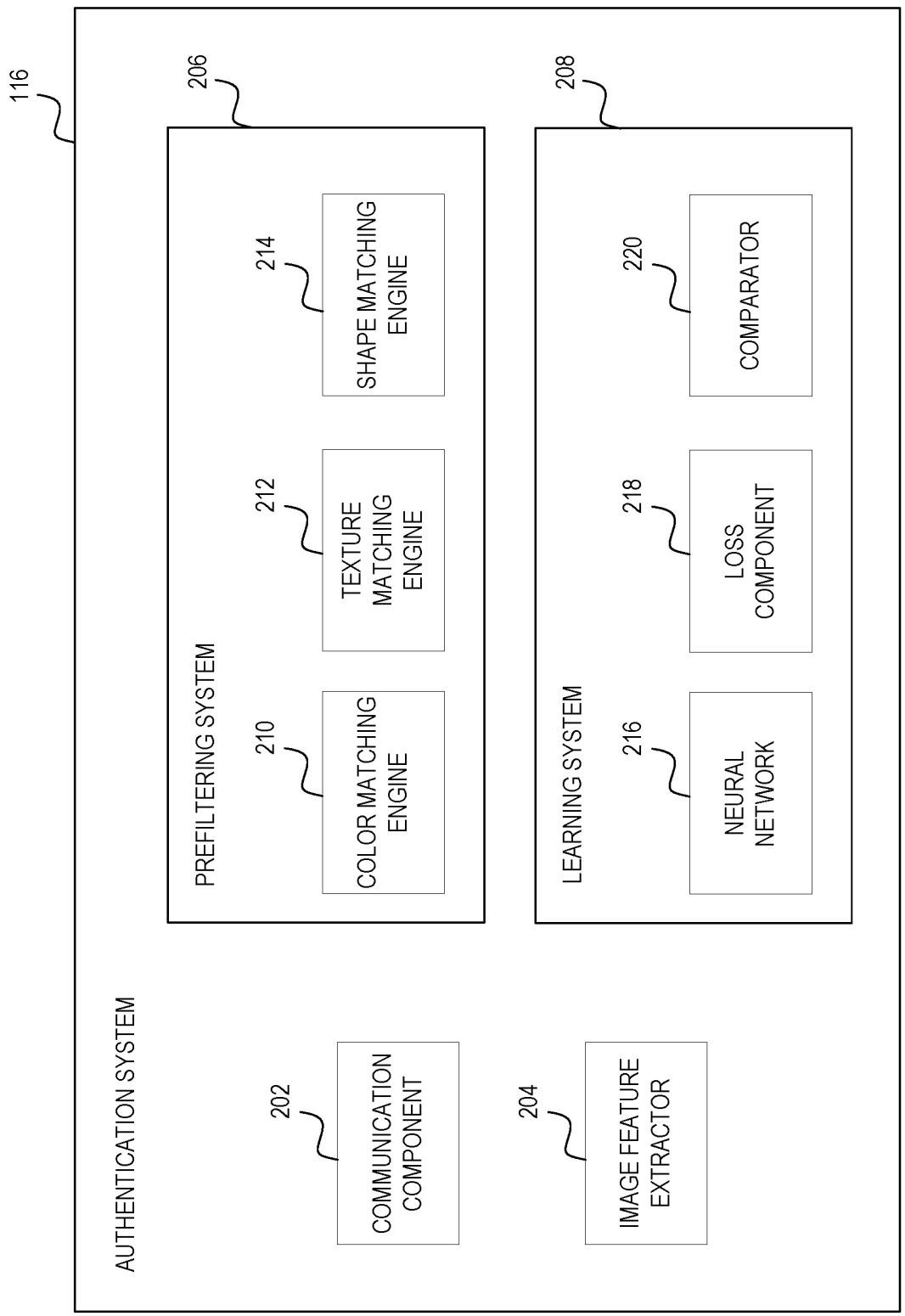
FIG. 2 is a diagram illustrating components of an authentication system that authenticates items based on object fingerprinting using deep learning, according to example embodiments.

FIG. 2 is a diagram illustrating components of the authentication system 116 that authenticates items based on object fingerprinting using deep learning, according to example embodiments. Because deep learning is computationally expensive, the authentication system 116 filters out obvious unauthentic items by prefiltering items based on easily identifiable visual features. Once filtered, any remaining items are then analyzed by a deep learning process or analysis. To enable these operations, the authentication system 116 comprises a communication component 202, an image feature extractor 204, a prefiltering system 206, and a learning system 208 all configured in communication with one another (e.g., via a bus, shared memory, or a switch).

The communication component 202 is configured to exchange data with other components of the network environment 100. Thus, the communication component 202 receives, from the client application 108 operating on the client device 106, a request to authenticate an item and an image of the item to be authenticated. In some cases, the communication component 202 also receives image(s) of an authentic item that is the same as or similar to the item to be authenticated. For example, a user at the client device 106 may transmit an image of an authentic item taken before it was shipped and an image of a returned item (e.g., the test item) that the user wants to make sure is the same item that was shipped. After analysis by the authentication system 116, the communication component 202 transmits a response to the query indicating the authenticity of the item.

The image feature extractor 204 is configured to extract visual features from the image of the item to be authenticated. In example embodiments, the image feature extractor 204 works with the prefiltering system 206 to perform the prefiltering analysis as will be discussed in more detail below. The extracted visual features can include color features, texture features, and shape features. Thus, the image feature extractor 204 analyzes the image to detect and isolate, for example, various colors, portions, or shapes. The extracted visual features are then transmitted to the prefiltering system 206 for analysis.

In some cases, the image feature extractor 204 also identifies an image of an authentic item that is the same or similar to the item to be authenticated if one is not included with the query. For instance, the query may include additional information that identifies the item to be authenticated (e.g., a title, serial number, description) and the image feature extractor 204 uses the additional information to find an authentic item image from an image library. In other cases, the image feature extractor 204 looks for an image of an authentic item that most closely matches the visual features extracted by the image feature extractor 204 from the image library. In some cases, the image feature extractor 204 extract the visual features from the image of the authentic item if these visual features are not previously extracted, stored, and accessible from the image library (e.g., in the data storage 120).

The prefiltering system 206 is configured to filter out obvious or easy to detect unauthentic items. Because deep learning consumes a lot of training data and takes a long time to do performance tuning, prefiltering helps the authentication system 116 be more efficient by filtering out easily identifiable unauthentic items based on matching of visual features between the item to be authenticated and an authentic version of the item. To enable the prefiltering operations, the prefiltering system 206 comprises a color matching engine 210, a texture matching engine 212, and a shape matching engine 214.

In some embodiments, the matching engines 210-214 operate in series or in a tiered manner. For example, if the color matching engine 210 determines that the image of the item to be authenticated satisfies a color matching threshold, then the prefiltering process continues to the texture matching engine 212. Assuming that the image of the item to be authenticated satisfies texture matching, then the prefiltering process continues to the shape matching engine 214 for shape matching analysis. Should the image satisfy all three matching engines 210-214, then the authentication system 118 can proceed with deep learning analysis. While an example order of the series or tiered manner is indicated above, it is noted that the order can be changed. For instance, texture matching analysis can be performed first. If the textures match, the color matching analysis can be performed next, followed by shape matching analysis. In yet further embodiments, the prefiltering system 206 may only perform two of the three matching analysis.

The color matching engine 210 is configured to perform the color matching analysis between the image of the item to be authenticated and the image of the authentic item. In example embodiments, the color matching engine 210 receives the color features extracted from the image of the item to be authenticated from the image feature extractor 204. The color matching engine 210 also receives or accesses color features of the image of the authentic item. Given the two sets of color features, the color matching engine 210 or the image feature extractor 204 clusters (e.g., using K-means clustering) the colors for each image and identifies a top number of dominate colors for each cluster. The color matching engine 210 then compares the top dominate colors from each image. If the comparison results in color matching that satisfies a color matching threshold, then the images are deemed to match in terms of color.

The texture matching engine 212 is configured to perform texture matching analysis between the image of the item to be authenticated and the image of the authentic item. In example embodiments, the texture matching engine 212 receives the texture features extracted for the image of the item to be authenticated from the image feature extractor 204. The texture matching engine 212 also receives or accesses texture features of the image of the authentic item. Given the two sets of texture features, the texture matching engine 212 computes a mean squared error between the two images and computes a texture matching error. The texture matching engine 212 then determines whether the texture matching error satisfies an error threshold. If the image texture matching error satisfies the error threshold, then the images are deemed to match in terms of texture.

The shape matching engine 214 is configured to perform shape matching analysis between the image of the item to be authenticated and the image of the authentic item. In example embodiments, the shape matching engine 214 receives the shape features extracted for the image of the item to be authenticated from the image feature extractor 204. The shape matching engine 214 also receives or accesses shape features of the image of the authentic item. The shape features comprise contours or outlines of objects in the images. The shape matching engine 214 computes a shape matching score based on the contours from the two images. If the shape matching score satisfies a shape matching threshold, then the images are deemed to match in terms of shape.

The learning system 208 is configured to perform deep learning on images of items to be authenticated that satisfy the prefiltering analysis. In example embodiments, the prefiltering analysis is satisfied if the image of the item to be authenticated matches the image of the authentic item in terms of color, texture, and shape. In one embodiment, the deep learning is performed by components including a neural network 216, a loss component 218, and a comparator 220.

In example embodiments, the neural network 216 is a convolution Siamese neural network (SNN). In some cases, the neural network 216 receives three images for analysis. A first image is of the item to be authenticated. The other two images are different images of the authentic item. The convolution SNN comprises identical convolution neural networks (CNN) that work in combination to determine similarity between the three images. Here, three CNNs will each analyze one of the images using a same weight. The convolution SNN also includes embedding models that factorize the output of the CNN into image embeddings that are then passed to the loss component 218. While examples are discussed with three CNNs analyzing three images, alternative embodiment can comprise other numbers of CNNs analyzing a same number of images.

The lost component 218 applies the image embeddings to a triplet loss. One of the two images from the authentic item is used as an anchor. The other two images are used to generate similarity scores with respect to the anchor.

The similarity scores are then passed to the comparator 220 which determines whether the item to be authenticated is real. Thus, if the similarity score between the anchor and the image of the item to be authenticated is higher or the same as the similarity score between the anchor and the other image of the authentic item, then the item is deemed to be authentic. In alternative embodiments, other similarity measures can be used. These other similarity measures include, for example, Euclidean Distance, Manhattan Distance, Jaccard Similarity, Minkowski Distance, and Cosine Similarity. In the case of cosine similarity, it is beneficial because even if two similar data objects are far apart by the Euclidean distance because of size, they can still have a smaller angle between them, which indicates a higher degree of similarity.

Figure 3:
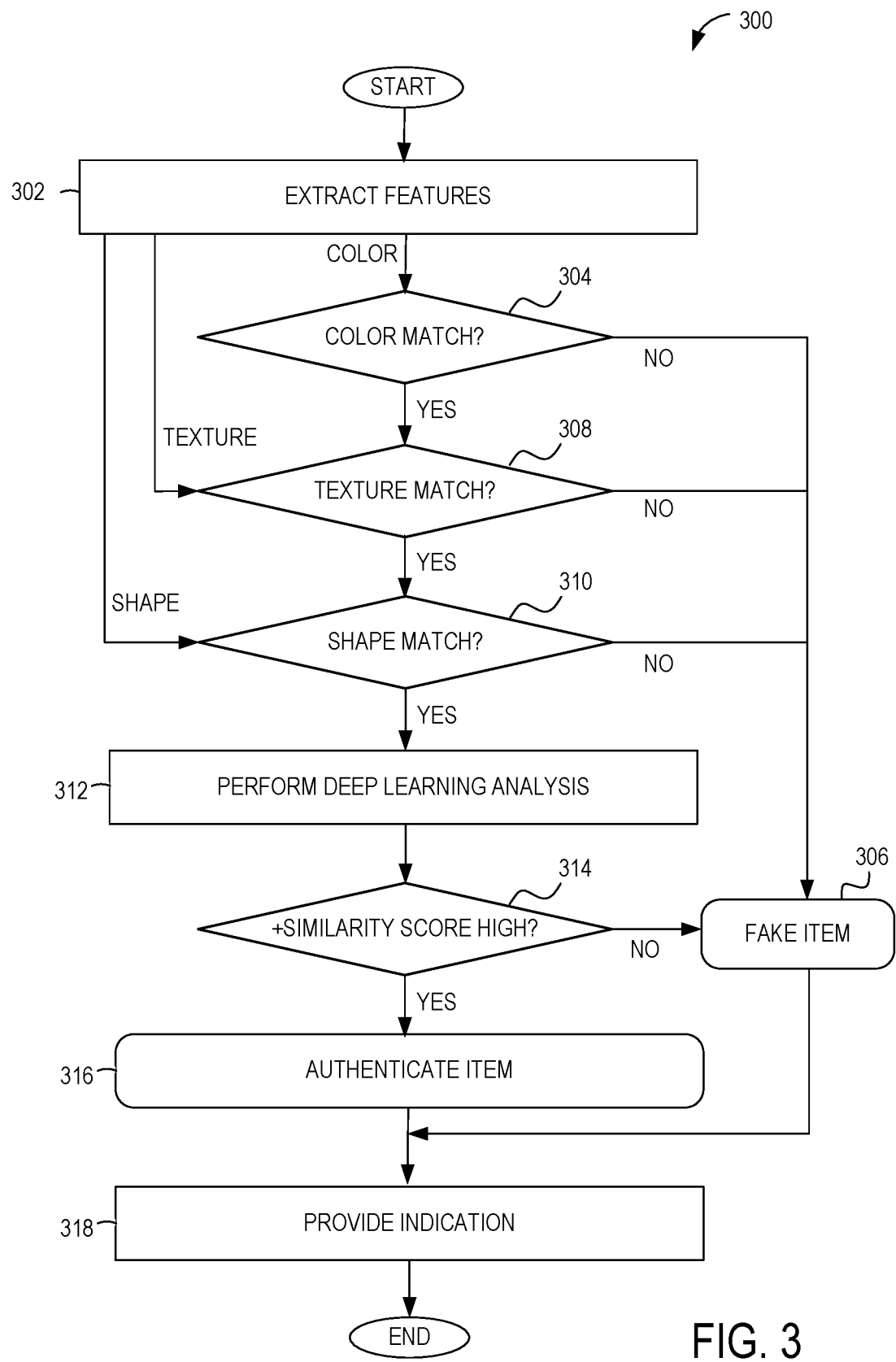
FIG. 3 is a flowchart illustrating operations of a method for authenticating an item, according to example embodiments.

FIG. 3 is a flowchart illustrating operations of an example method 300 for authenticating an item, according to example embodiments. Operations in the method 300 may be performed by the authentication system 116, using components described above with respect to FIG. 2. Accordingly, the method 300 is described by way of example with reference to the authentication system 116. However, it shall be appreciated that at least some of the operations of the method 300 may be deployed on various other hardware configurations or be performed by similar components residing elsewhere in the network environment 100. Therefore, the method 300 is not intended to be limited to the authentication system 116.

In operation 302, the image feature extractor 204 extracts visual features from an image of an item to be authenticated (also referred to as "test item image") and from an image of an authentic item (also referred to as "authentic item image") that is the same or very similar to the item to be authenticated. For example, the communication component 202 receives a request to authenticate an item along with an image of the item to be authenticated. The image of the authentic item may be identified by the image feature extractor 204 from images stored at the network system 102 (e.g., associated with a profile/account of a user that wants to authenticate the item; from image library) or received with the request for authentication. For example, a seller may have taken a photo of the item (e.g., image of the authentic item) before shipping the item to a buyer and takes a photo of a returned item (e.g., image of the item to be authenticated). The photo of the item before shipping can be stored to a profile or account of the seller or sent with the request for authentication. For simplicity of discussion, the operations will be discussed whereby the item to be authenticated is a trading card. In example cases, the visual features that are extracted include colors in the image, texture in the image, and shape of items in the image.

In operation 304, a determination is made by the color matching engine 210 whether the colors extracted from the test item image match, within a color matching threshold, to colors in the authentic item image. Operations 302 and 304 will be discussed in more detail in connection with FIG. 4 below.

If the color matching engine 210 determines that the colors in the test item image does not match the colors in the authentic item image, the item to be authenticated is marked as a fake item in operation 306. However, if the color matching engine 210 determines that the colors in the test item image do match within the color matching threshold, then the method 300 continues to operation 308.

In operation 308, a determination is made by the texture matching engine 212 whether the texture extracted from the test item image matches, within a texture error threshold, to a texture in the authentic item image. For example, the texture of paper or cardstock of an authentic trading card may be different from the texture of paper or cardstock of a fake trading card. Operations 302 and 308 will be discussed in more detail in connection with FIG. 5 below.

If the texture matching engine 212 determines that the texture in the test item image does not match the texture in the authentic item image, the item to be authenticated is marked as a fake item in operation 306. However, if the texture matching engine 212 determines that the texture in the test item image does match within the texture error threshold, then the method 300 continues to operation 310.

In operation 310, a determination is made by the shape matching engine 214 whether the shapes (e.g., contours) extracted from the test item image match, within a shape matching threshold, to shapes in the authentic item image. Operations 302 and 310 will be discussed in more detail in connection with FIG. 6 below.

If the shape matching engine 214 determines that the shapes in the test item image do not match the shapes in the authentic item image, the item to be authenticated is marked as a fake item in operation 306. However, if the shape matching engine 214 determines that the shapes in the test item image do match within the shape matching threshold, then the method 300 continues to operation 312.

The prefiltering analysis comprises operations 302-310. While a particular order to the matching analysis is discussed above (e.g., color matching followed by texture matching followed by shape matching), alternative embodiments can perform the prefiltering analysis with a different order to the matching analysis.

In operation 312, deep learning analysis is performed by the learning system 208. The deep learning analysis provides similarity scores between the image of the item to be authenticated and image(s) the authentic item(s). Operation 312 will be discussed in more detail in connection with FIG. 7 below.

In operation 314, a determination is made whether the positive similarity score is higher than a negative similarity score. If the similarity score is not higher, then the item is deemed to be a fake item in operation 306. Conversely, if the similarity score is higher, then the item is deemed to be an authentic item in operation 316. Alternatively, other similarity measures can be used.

In operation 318, the authentication system 116 provides an indication of the authenticity of the item. The indication can be presented, for example, on a user interface of the client device 106 (e.g., via the client application 108). In some cases, the indication may be provided in a notification that that is electronically communicated to the client device 106 (e.g., via an email or text message).

Figure 4:
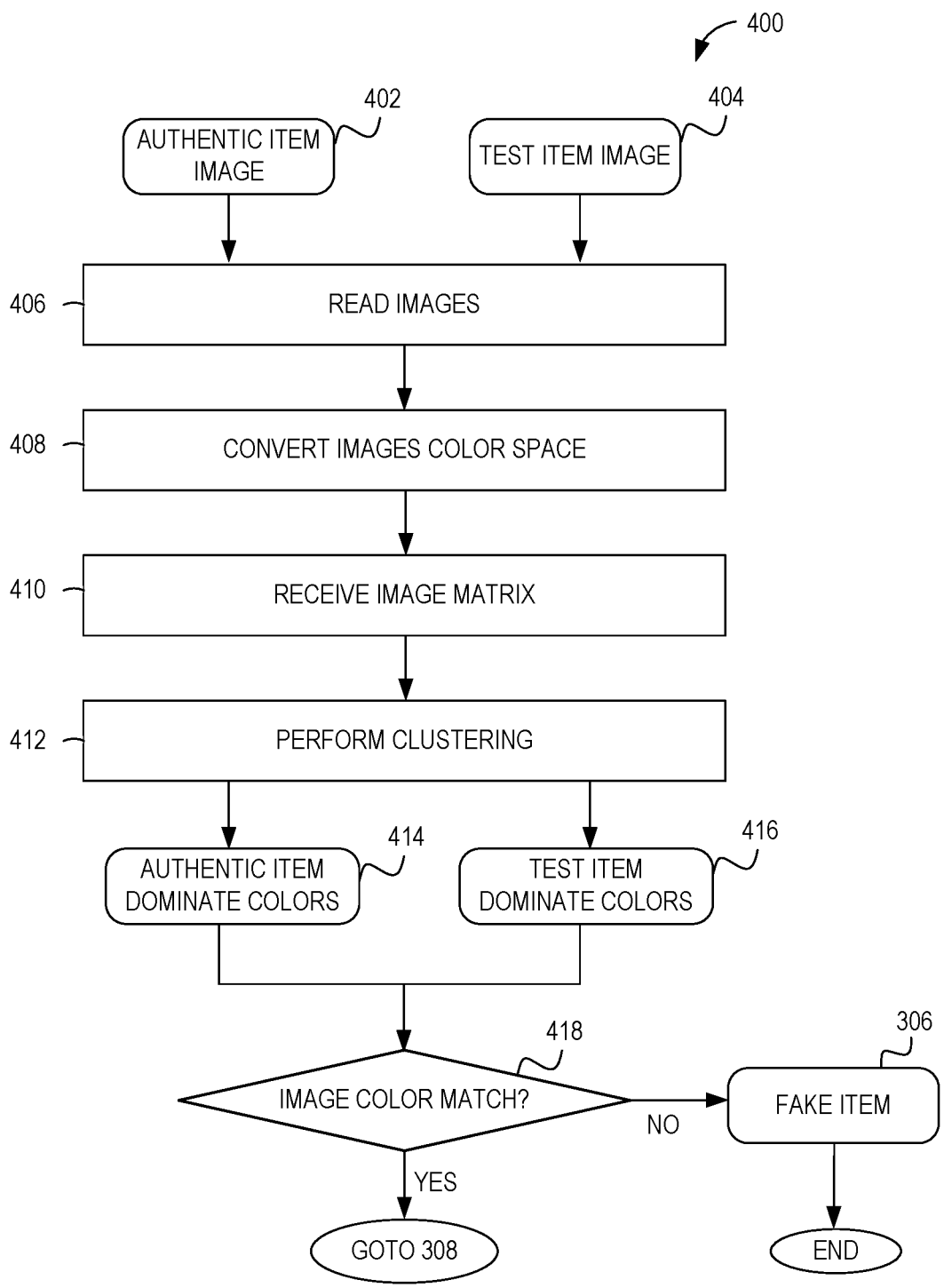
FIG. 4 is a flowchart illustrating operations of a method for performing color matching, according to example embodiments.

FIG. 4 is a flowchart illustrating operations of a method 400 (e.g., operations 302 and 304) for performing color matching, according to example embodiments. Operations in the method 400 may be performed by the authentication system 116, using components described above with respect to FIG. 2. Accordingly, the method 400 is described by way of example with reference to the authentication system 116. However, it shall be appreciated that at least some of the operations of the method 400 may be deployed on various other hardware configurations or be performed by similar components residing elsewhere in the network environment 100. Therefore, the method 400 is not intended to be limited to the authentication system 116.

The method 400 starts with extracting color features (e.g., operation 302) from an authentic item image 402 (e.g., authentic trading card) and a test item image 404 (e.g., trading card to be authenticated). Thus, in operation 402, the image feature extractor 204 reads the images 402 and 404. It is noted that the images may be captured by a microscope or by a simple client device 106 camera application. That is, no special equipment is needed to capture the images.

In operation 408, the image feature extractor 204 converts the image color space obtained from reading the images to a space that can be easily processed by the authentication system 116. For example, the image color space obtained from reading the image may be red, green, blue (RGB) color space and the converted color space may be color hex code. An example of the converted color space for color hex code is Red: #FF0000, Green: #00FF00, and Blue: #0000FF.

Based on the image conversion in operation 408, a resulting image matrix is received for each of the authentic image 402 and the test item image 404 in operation 410. Each image matrix will illustrate the colors of the corresponding image 402 and 404 in the converted color space.

Using the image matrices, clustering is performed, in operation 412, to cluster colors for each of the images 402 and 404. In one embodiment, the clustering is K-means clustering. However, other types of clustering can be used in alternative embodiments. The result of the clustering is a set of authentic item dominate colors 414 and a set of test item dominate colors.

In operation 418, the color matching engine 210 performs color matching analysis. Thus, a top number (e.g., ten) of authentic item dominate colors 414 is compared to a same top number of test item dominate colors 416. If the comparison indicates that the top dominate colors match, then the method 400 proceeds to a next tier of visual feature comparison (e.g., to operation 308 where texture matching is performed). In some cases, the top dominate colors need to completely match, while in other cases, the color matching must be within a color matching threshold (e.g., 90% match).

If the comparison indicates that the top dominate colors do not match (or are not within the color matching threshold), then the test item is deemed a fake item in operation 306. The method 400 then end.

Figure 5:
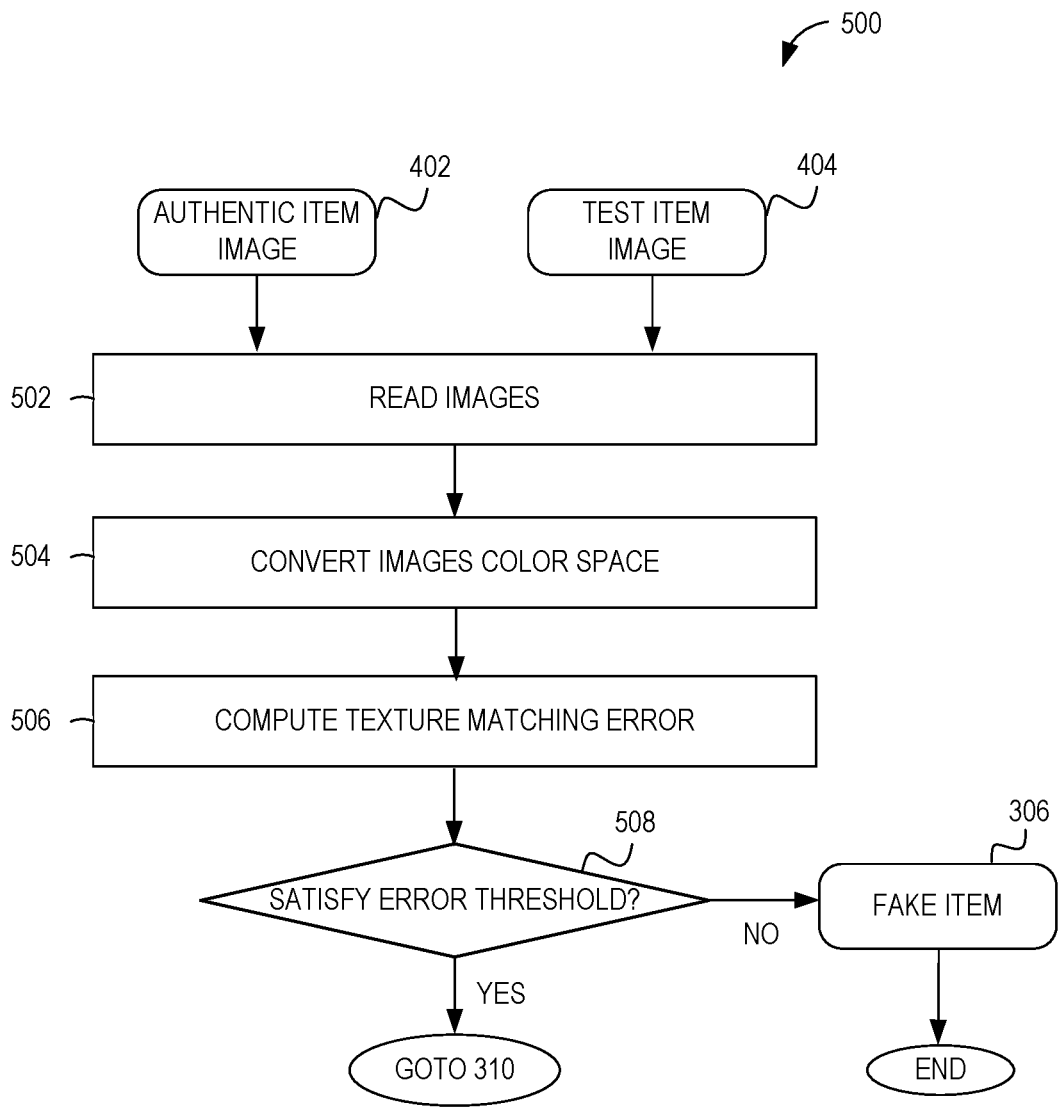
FIG. 5 is a flowchart illustrating operations of a method for performing texture matching, according to example embodiments.

FIG. 5 is a flowchart illustrating operations of a method 500 (e.g., operations 302 and 308) for performing texture matching, according to example embodiments. Operations in the method 500 may be performed by the authentication system 116, using components described above with respect to FIG. 2. Accordingly, the method 500 is described by way of example with reference to the authentication system 116. However, it shall be appreciated that at least some of the operations of the method 500 may be deployed on various other hardware configurations or be performed by similar components residing elsewhere in the network environment 100. Therefore, the method 500 is not intended to be limited to the authentication system 116.

The method 500 starts with extracting texture features (e.g., operation 302) from the authentic item image 402 (e.g., authentic trading card) and the test item image 404 (e.g., trading card to be tested). Thus, in operation 502, the image feature extractor 204 reads the images 402 and 404. Similar to operation 408, the image feature extractor 204 or the texture matching engine 212 converts the image color space obtained from reading the images to a space that can be easily processed by the authentication system 116 in operation 504. In some cases, the conversion may include resizing to a uniform size.

In operation 506, the texture matching engine 212 computes a texture matching error for the test item image 404. In one embodiment, the texture matching engine 202 computes a mean-square error (MSE) based on the converted image color spaces of the authentic item image 402 and the test item image 404 in order to determine the image matching error. For example, the equation to calculate the MSE can be:

$$MSE = \frac{\Sigma(y_i - \hat{y}_i)^2}{n}$$

where n indicates a number of data points or observations, $y_i$ is an $i^{th}$ observed value, and $\hat{y}_i$ is a corresponding predicted value. The observed value is that of the test item image 404 and the predicted value is that of the authentic item image 402.

Alternatively, SSIM (Structural Similarity Index) can be used. The difference between MSE and SSIM is, for MSE, a value of zero indicates perfect similarity and a value greater than one implies less similarity and will continue to grow as an average difference between pixel intensities increases as well. For SSIM, its value can vary between −1 and 1, where 1 indicates perfect similarity. Furthermore, SSIM attempts to model a perceived change in the structural information of the image, whereas MSE is estimating the perceived errors. There is a subtle difference between the two, but the results are dramatic. A measure between two images, x and y, can be calculated, for example, by:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where $\mu_x$, $\mu_y$, $\sigma_x$, $\sigma_y$, and $\sigma_{xy}$ are the local means, standard deviations, and cross-covariance for images x, y. Here, image x is the authentic item image 402 and image y is the test item image 404. A resultant SSIM index is a decimal value between −1 and 1, where 1 indicates perfect similarity, 0 indicates no similarity, and −1 indicates perfect anti-correlation.

In operation 508, the texture matching engine 212 determines whether the image matching error satisfies an error threshold. For example, the error threshold for MSE may be 25. Thus, any error value between 0 and 25 will indicate that the textures match. For SSIM, when the SSIM between image 1 (authentic item image 402) and image 2 (test item image 404) is calculated, if the result is between 0.75 and 1, then the test item image 404 matches the authentic item image 402 and it is assumed that the test item image 404 satisfies the error threshold. If the image matching error satisfies the error threshold, then the method 500 proceeds to a next tier of visual feature comparison (e.g., to operation 310 where shape matching is performed). However, if image matching error does not satisfy the error threshold, then the test item is deemed a fake item in operation 306 and the method 500 ends.

Figure 6:
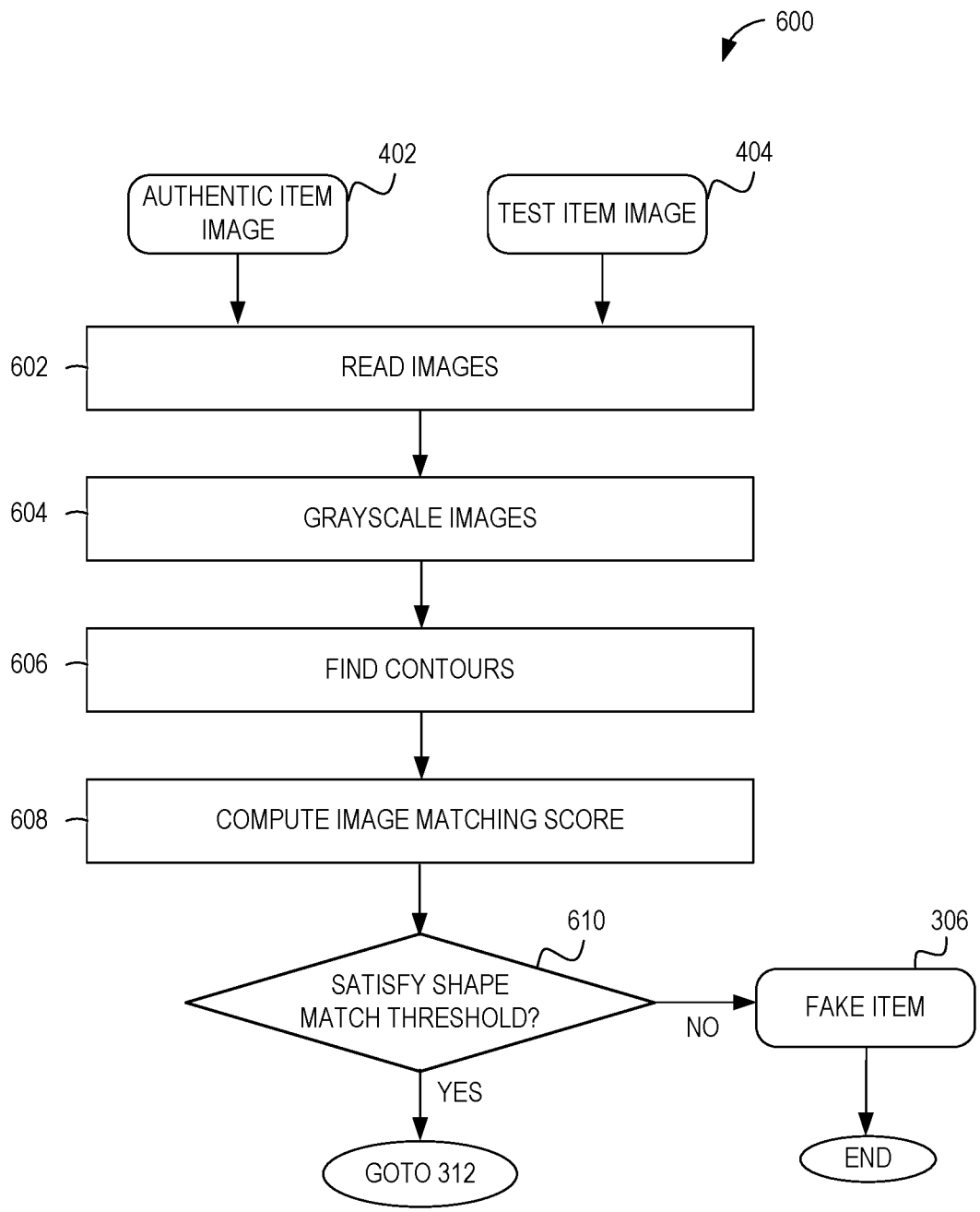
FIG. 6 is a flowchart illustrating operations of a method for performing shape matching, according to example embodiments.

FIG. 6 is a flowchart illustrating operations of a method 600 (e.g., operations 302 and 310) for performing shape matching, according to example embodiments. Operations in the method 600 may be performed by the authentication system 116, using components described above with respect to FIG. 2. Accordingly, the method 600 is described by way of example with reference to the authentication system 116. However, it shall be appreciated that at least some of the operations of the method 600 may be deployed on various other hardware configurations or be performed by similar components residing elsewhere in the network environment 100. Therefore, the method 600 is not intended to be limited to the authentication system 116.

The method 600 starts with extracting shape features (e.g., operation 302) from the authentic item image 402 (e.g., authentic trading card) and the test item image 404 (e.g., trading card to be tested). Thus, in operation 602, the image feature extractor 204 reads the images 402 and 404.

In operation 604, the image feature extractor 204 grayscales the images 402 and 404. By grayscaling, the shapes of the items in the image become more prevalent.

In operation 606, the image feature extractor 204 detects the contours in the grayscaled images. For example, the image feature extractor 204 finds the outlines of major or prevalent items in the images. In the trading card example, an individual pictured in the authentic trading card may have a slightly different stance or posture than an individual pictured in the test trading card resulting in a slight difference in the contour or shape of the individual.

In operation 608, the shape matching engine 214 computes an image matching score based on the contours from the two images 402 and 404. In one example, the image matching score is determined by calling a MatchShapes function or algorithm (e.g., stored in a library or data storage 120) whereby the different contours are compared, and the scores based on the comparison are summed.

In operation 610, the shape matching engine 214 determines if the image matching score satisfies a shape matching threshold. For example, the shape matching threshold may be 95% shape matching between the two images. If the image matching score satisfies the shape match threshold, then the method 600 proceeds to the deep learning analysis in operation 312. However, if image matching score does not satisfy the shape matching threshold, then the test item is deemed a fake item in operation 306 and the method 600 ends.

Figure 7:
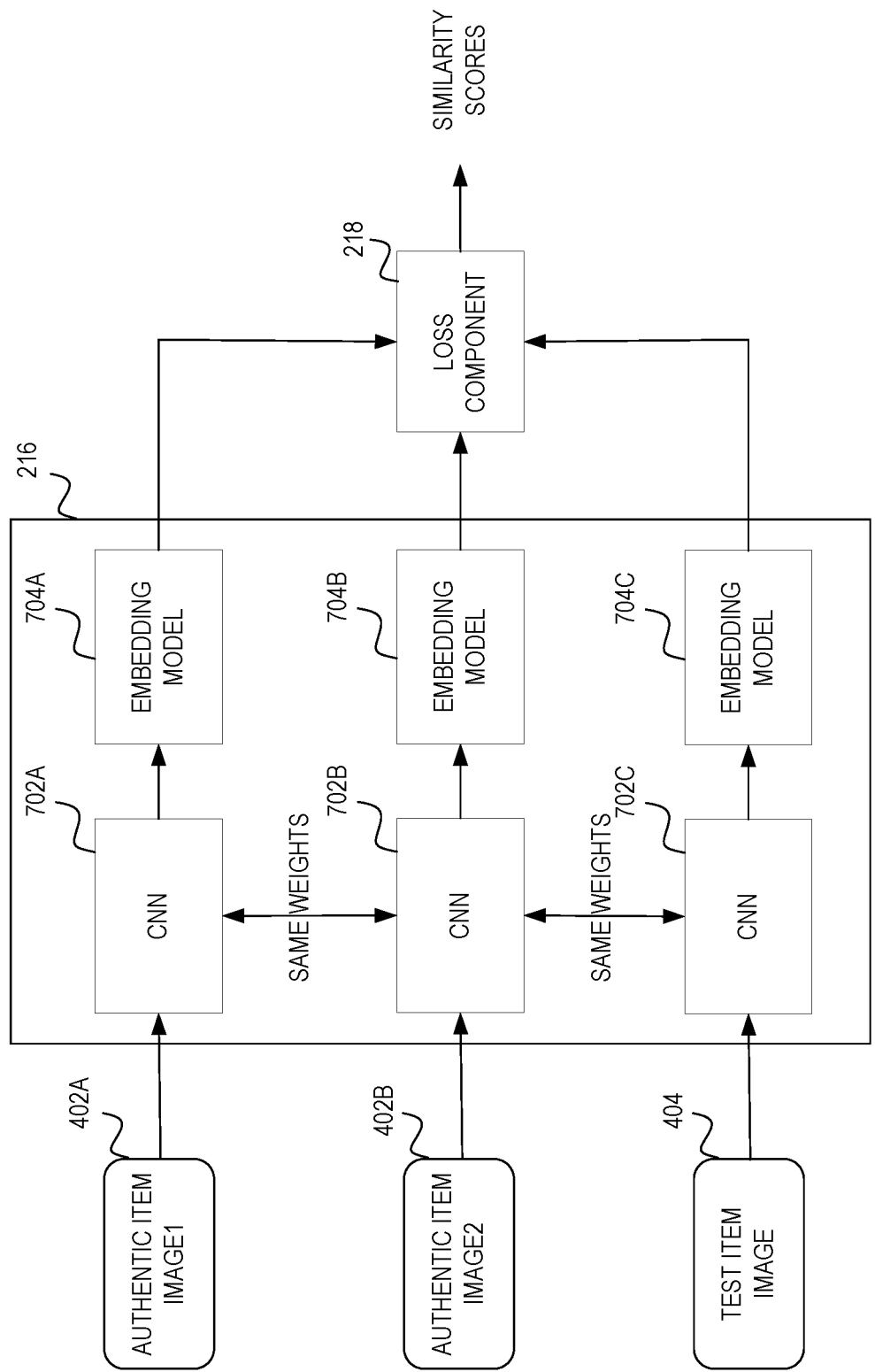
FIG. 7 is a diagram illustrating deep learning analysis, according to example embodiments.

FIG. 7 is a diagram illustrating the deep learning analysis, according to example embodiments. Operations FIG. 7 may be performed by the learning system 208, using components described above with respect to FIG. 2. Accordingly, the method 700 is described by way of example with reference to the learning system 208. However, it shall be appreciated that at least some of the operations of the method 700 may be deployed on various other hardware configurations or be performed by similar components residing elsewhere in the network environment 100. Therefore, the method 700 is not intended to be limited to the learning system 208.

In example embodiments, the deep learning analysis uses a first authentic item image (authentic item image1) 402a, a second authentic item image (authentic item image2) 402b, and the test image 404. One of the authentic item images 402a or 402b may be the same authentic item image used in the prefiltering analysis. The authentic item images 402a and 402b may be captured from the same authentic item or two different authentic items. The authentic item images 402a and 402b and the test image 404 are provided to the neural network 216.

In example embodiments, the neural network 216 is a convolution Siamese neural network (SNN). The convolution SNN comprises identical convolution neural networks (CNN) 702A-702C that work in combination to analyze the three images 402a, 402b, and 404. Here, three CNNs 702A-702C share the same modeling architecture and weights. The convolution SNN also includes embedding models 704a-704c that factorizes the output of the CNNs 702A-702C into image embeddings that are then passed to the loss component 218.

The lost component 218 applies the image embeddings to a triplet loss. One of the two authentic item images 402a or 402b is used as an anchor. For example, the authentic item image 402a or 402b that was used in the prefiltering analysis may be selected as the anchor. The other two images are used to generate similarity scores (e.g., positive and negative similarity scores) with respect to the anchor. The similarity scores are then passed to the comparator 220 which determines whether the test item is real.

For instance, using a fake item image and the two authentic item images 402, a SNN model is trained. The objective is to keep a distance between the anchor and a positive smaller than a distance between the anchor and a negative. Assuming the anchor (a) is the authentic item image 402a, the positive (p) is the authentic item image 402b, and the negative (n) is the fake item image. Based on an example function, $L=\max(d(a,p)-d(a,n)+\text{margin},0)$, the SNN model tries to minimize the loss L, which pushes $d(a, p)$ to 0 and $d(a, n)$ to be greater than $d(a, p)+\text{margin}$. In other words, the SNN model is trained to learn to minimize the loss between the anchor (a) (authentic item image 402a) and positive (p) (authentic item image 402b). This means that, after training, the positive (p) (authentic item image 402b) will be closer to the anchor (a) (authentic item image 402a) while the negative (n) (fake item image) will be farther from the anchor (a). The purpose here is to have the SNN model learn to minimize distance-based loss between the authentic item image 402a and the authentic item image 402b, while maximize the distance between the authentic item image 402a and the fake item image.

After training the SNN, the SNN model is consumed and similarity scores that measure similarity between embeddings generated for each image is calculated. Assuming the anchor is the authentic item image 402a, the positive is the authentic item image 402b, and the negative is the test item image 404, a cosine similarity between the anchor and the positive (positive_similarity) and a cosine similarity between the anchor and the negative (negative_similarity) is calculated. If the positive_similarity (similarity between the authentic item image 402a and the authentic item image 402b) is larger than the negative_similarity (similarity between the authentic item image 402a and the test item image 404), then the test item is fake. Otherwise, the test item is authentic.

Figure 8:
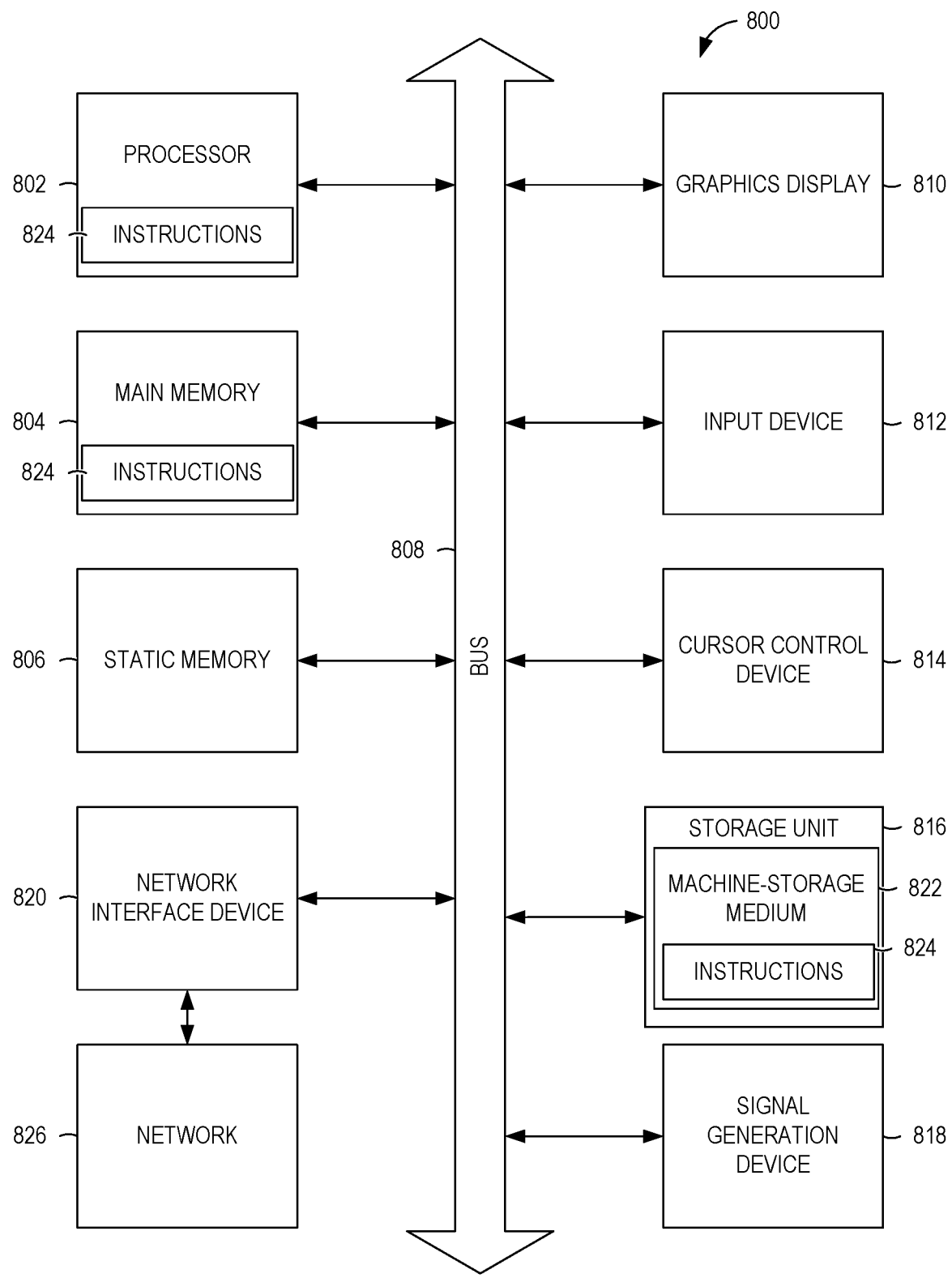
FIG. 8 is a block diagram illustrating components of a machine, according to some examples, able to read instructions from a machine-storage medium and perform any one or more of the methodologies discussed herein.

FIG. 8 illustrates components of a machine 800, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIG. 3 to FIG. 7. In one embodiment, the instructions 824 can transform the machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more components described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-storage medium 822 (e.g., a tangible machine-storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-storage media (e.g., tangible and non-transitory machine-storage media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for authenticating items using object fingerprinting and deep learning. The method comprises receiving a request to authenticate an item from a client device; extracting visual features from an image of the item to be authenticated; using the visual features, performing prefiltering analysis by comparing the visual features from the image of the item to visual features of an image of an authentic item that is the same as or similar to the item to be authenticated; based on the prefiltering analysis indicating that the visual features from the image of the item matches the visual features from the image of the authentic item, performing deep learning analysis by applying the image of the item and at least two other images including the image of the authentic item to a convolutional Siamese neural network (SNN), the convolutional SNN generating image embeddings used to derive similarity scores; based on the similarity scores, making a determination whether the item is authentic; and transmitting an indication of the determination to the client device.

In example 2, the subject matter of example 1 can optionally include wherein the convolutional SNN comprises a plurality of convolutional neural networks (CNNs) and a same number of embedding models.

In example 3, the subject matter of any of examples 1-2 can optionally include wherein performing the deep learning analysis comprises generating the image embeddings by applying the image of the item and the at least two other images to respective convolutional neural networks (CNNs) of the convolutional SNN, the CNNs using common weights; and factorizing outputs of the CNNs into the image embeddings using embedding models.

In example 4, the subject matter of any of examples 1-3 can optionally include wherein performing the deep learning analysis comprises applying the image embeddings to a triplet loss; and based on the applying, obtaining the similarity scores.

In example 5, the subject matter of any of examples 1-4 can optionally include wherein performing the prefiltering analysis comprises performing a combination of color matching analysis, texture matching analysis, and shape matching analysis, wherein the item satisfies the combination of the color matching analysis, the texture matching analysis, and the shape matching analysis in order for the deep learning analysis to be performed.

In example 6, the subject matter of any of examples 1-5 can optionally include wherein performing the prefiltering analysis comprises performing color matching analysis, the performing color matching analysis comprising extracting color information from the image of the item and the image of the authentic item; clustering colors from the image of the item; clustering colors from the image of the authentic item; and determining whether a top number of dominant colors in the image of the item matches a top number of dominant colors in the image of the authentic item.

In example 7, the subject matter of any of examples 1-6 can optionally include wherein performing the prefiltering analysis comprises performing texture matching analysis, the performing texture matching analysis comprising computing a mean squared error between the image of the item and the image of the authentic item; computing a texture matching error based on the mean squared error; and determining whether the texture matching error satisfies an error threshold.

In example 8, the subject matter of any of examples 1-7 can optionally include wherein performing the prefiltering analysis comprises performing shape matching analysis, the performing shape matching analysis comprising grayscaling the image of the item and the image of the authentic item; identifying contours in the grayscaled images; computing a shape matching score based on the contours; and determining whether the shape matching score satisfies a shape matching threshold.

In example 9, the subject matter of any of examples 1-8 can optionally include wherein the item to be authenticated comprises a trading card.

In example 10, the subject matter of any of examples 1-9 can optionally include wherein the image of the authentic item comprises an image captured by a user of the client device prior to shipping the authentic item and the image of the item to be authenticated comprises an image captured by the user in response to a return of the item.

Example 11 is a system for authenticating items using object fingerprinting and deep learning. The system comprises one or more processors and a memory storing instructions that, when executed by the one or more processors, cause the one or more processors to perform operations comprising receiving a request to authenticate an item from a client device; extracting visual features from an image of the item to be authenticated; using the visual features, performing prefiltering analysis by comparing the visual features from the image of the item to visual features of an image of an authentic item that is the same as or similar to the item to be authenticated; based on the prefiltering analysis indicating that the visual features from the image of the item matches the visual features from the image of the authentic item, performing deep learning analysis by applying the image of the item and at least two other images including the image of the authentic item to a convolutional Siamese neural network (SNN), the convolutional SNN generating image embeddings used to derive similarity scores; based on the similarity scores, making a determination whether the item is authentic; and transmitting an indication of the determination to the client device.

In example 12, the subject matter of example 11 can optionally include wherein the convolutional SNN comprises a plurality of convolutional neural networks (CNNs) and a same number of embedding models.

In example 13, the subject matter of any of examples 11-12 can optionally include wherein performing the deep learning analysis comprises generating the image embeddings by applying the image of the item and the at least two other images to respective convolutional neural networks (CNNs) of the convolutional SNN, the CNNs using common weights; and factorizing outputs of the CNNs into the image embeddings using embedding models.

In example 14, the subject matter of any of examples 11-13 can optionally include wherein performing the deep learning analysis comprises applying the image embeddings to a triplet loss; and based on applying the image embedding, obtaining the similarity scores.

In example 15, the subject matter of any of examples 11-14 can optionally include wherein performing the prefiltering analysis comprises performing a combination of color matching analysis, texture matching analysis, and shape matching analysis, wherein the item satisfies the combination of the color matching analysis, the texture matching analysis, and the shape matching analysis in order for the deep learning analysis to be performed.

In example 16, the subject matter of any of examples 11-15 can optionally include wherein performing the prefiltering analysis comprises performing color matching analysis, the performing color matching analysis comprising extracting color information from the image of the item and the image of the authentic item; clustering colors from the image of the item; clustering colors from the image of the authentic item; and determining whether a top number of dominant colors in the image of the item matches a top number of dominant colors in the image of the authentic item.

In example 17, the subject matter of any of examples 11-16 can optionally include wherein performing the prefiltering analysis comprises performing texture matching analysis, the performing texture matching analysis comprising computing a mean squared error between the image of the item and the image of the authentic item; computing a texture matching error based on the mean squared error; and determining whether the texture matching error satisfies an error threshold.

In example 18, the subject matter of any of examples 11-17 can optionally include wherein performing the pre-filtering analysis comprises performing shape matching analysis, the performing shape matching analysis comprising grayscaling the image of the item and the image of the authentic item; identifying contours in the grayscaled images; computing a shape matching score based on the contours; and determining whether the shape matching score satisfies a shape matching threshold.

In example 19, the subject matter of any of examples 11-18 can optionally include wherein the image of the authentic item comprises an image captured by a user of the client device prior to shipping the authentic item and the image of the item to be authenticated comprises an image captured by the user in response to a return of the item.

Example 20 is a computer-storage medium comprising instructions which, when executed by one or more processors of a machine, cause the machine to perform operations for authenticating items using object fingerprinting and deep learning. The operations comprise receiving a request to authenticate an item from a client device; extracting visual features from an image of the item to be authenticated; using the visual features, performing prefiltering analysis by comparing the visual features from the image of the item to visual features of an image of an authentic item that is the same as or similar to the item to be authenticated; based on the prefiltering analysis indicating that the visual features from the image of the item matches the visual features from the image of the authentic item, performing deep learning analysis by applying the image of the item and at least two other images including the image of the authentic item to a convolutional Siamese neural network (SNN), the convolutional SNN generating image embeddings used to derive similarity scores; based on the similarity scores, making a determination whether the item is authentic; and transmitting an indication of the determination to the client device.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method comprising:
   receiving a request to authenticate an item from a client device;
   extracting visual features from an image of the item to be authenticated;
   using the visual features, performing prefiltering analysis by comparing the visual features from the image of the item to visual features of an image of an authentic item that is the same as or similar to the item to be authenticated;
   based on the prefiltering analysis indicating that the visual features from the image of the item matches the visual features from the image of the authentic item, performing deep learning analysis by applying the image of the item and at least two other images including the image of the authentic item to a convolutional Siamese neural network (SNN), the convolutional SNN generating image embeddings used to derive similarity scores;
based on the similarity scores, making a determination whether the item is authentic; and
transmitting an indication of the determination to the client device.

2. The method of claim 1, wherein the convolutional SNN comprises a plurality of convolutional neural networks (CNNs) and a same number of embedding models.

3. The method of claim 1, wherein performing the deep learning analysis comprises:
generating the image embeddings by applying the image of the item and the at least two other images to respective convolutional neural networks (CNNs) of the convolutional SNN, the CNNs using common weights; and
factorizing outputs of the CNNs into the image embeddings using embedding models.

4. The method of claim 1, wherein performing the deep learning analysis comprises:
applying the image embeddings to a triplet loss; and
based on applying the image embedding, obtaining the similarity scores.

5. The method of claim 1, wherein performing the prefiltering analysis comprises performing a combination of color matching analysis, texture matching analysis, and shape matching analysis, wherein the item satisfies the combination of the color matching analysis, the texture matching analysis, and the shape matching analysis in order for the deep learning analysis to be performed.

6. The method of claim 1, wherein performing the prefiltering analysis comprises performing color matching analysis, the performing color matching analysis comprising:
extracting color information from the image of the item and the image of the authentic item;
clustering colors from the image of the item;
clustering colors from the image of the authentic item; and
determining whether a top number of dominant colors in the image of the item matches a top number of dominant colors in the image of the authentic item.

7. The method of claim 1, wherein performing the prefiltering analysis comprises performing texture matching analysis, the performing texture matching analysis comprising:
computing a mean squared error between the image of the item and the image of the authentic item;
computing a texture matching error based on the mean squared error; and
determining whether the texture matching error satisfies an error threshold.

8. The method of claim 1, wherein performing the prefiltering analysis comprises performing shape matching analysis, the performing shape matching analysis comprising:
grayscaling the image of the item and the image of the authentic item;
identifying contours in the grayscaled images;
computing a shape matching score based on the contours; and
determining whether the shape matching score satisfies a shape matching threshold.

9. The method of claim 1, wherein the item to be authenticated comprises a trading card.

10. The method of claim 1, wherein the image of the authentic item comprises an image captured by a user of the client device prior to shipping the authentic item and the image of the item to be authenticated comprises an image captured by the user in response to a return of the item.

11. A system comprising:
one or more processors; and
a memory storing instructions that, when executed by the one or more processors, cause the one or more processors to perform operations comprising:
receiving a request to authenticate an item from a client device;
extracting visual features from an image of the item to be authenticated;
using the visual features, performing prefiltering analysis by comparing the visual features from the image of the item to visual features of an image of an authentic item that is the same as or similar to the item to be authenticated;
based on the prefiltering analysis indicating that the visual features from the image of the item matches the visual features from the image of the authentic item, performing deep learning analysis by applying the image of the item and at least two other images including the image of the authentic item to a convolutional Siamese neural network (SNN), the convolutional SNN generating image embeddings used to derive similarity scores;
based on the similarity scores, making a determination whether the item is authentic; and
transmitting an indication of the determination to the client device.

12. The system of claim 11, wherein the convolutional SNN comprises a plurality of convolutional neural networks (CNNs) and a same number of embedding models.

13. The system of claim 11, wherein performing the deep learning analysis comprises:
generating the image embeddings by applying the image of the item and the at least two other images to respective convolutional neural networks (CNNs) of the convolutional SNN, the CNNs using common weights; and
factorizing outputs of the CNNs into the image embeddings using embedding models.

14. The system of claim 11, wherein performing the deep learning analysis comprises:
applying the image embeddings to a triplet loss; and
based on applying the image embedding, obtaining the similarity scores.

15. The system of claim 11, wherein performing the prefiltering analysis comprises performing a combination of color matching analysis, texture matching analysis, and shape matching analysis, wherein the item satisfies the combination of the color matching analysis, the texture matching analysis, and the shape matching analysis in order for the deep learning analysis to be performed.

16. The system of claim 11, wherein performing the prefiltering analysis comprises performing color matching analysis, the performing color matching analysis comprising:
extracting color information from the image of the item and the image of the authentic item;
clustering colors from the image of the item;
clustering colors from the image of the authentic item; and
determining whether a top number of dominant colors in the image of the item matches a top number of dominant colors in the image of the authentic item.

17. The system of claim 11, wherein performing the prefiltering analysis comprises performing texture matching analysis, the performing texture matching analysis comprising:
- computing a mean squared error between the image of the item and the image of the authentic item;
- computing a texture matching error based on the mean squared error; and
- determining whether the texture matching error satisfies an error threshold.

18. The system of claim 11, wherein performing the prefiltering analysis comprises performing shape matching analysis, the performing shape matching analysis comprising:
- grayscaling the image of the item and the image of the authentic item;
- identifying contours in the grayscaled images;
- computing a shape matching score based on the contours; and
- determining whether the shape matching score satisfies a shape matching threshold.

19. The system of claim 11, wherein the image of the authentic item comprises an image captured by a user of the client device prior to shipping the authentic item and the image of the item to be authenticated comprises an image captured by the user in response to a return of the item.

20. A machine-storage medium comprising instructions which, when executed by one or more processors of a machine, cause the machine to perform operations comprising:
- receiving a request to authenticate an item from a client device;
- extracting visual features from an image of the item to be authenticated;
- using the visual features, performing prefiltering analysis by comparing the visual features from the image of the item to visual features of an image of an authentic item that is the same as or similar to the item to be authenticated;
- based on the prefiltering analysis indicating that the visual features from the image of the item matches the visual features from the image of the authentic item, performing deep learning analysis by applying the image of the item and at least two other images including the image of the authentic item to a convolutional Siamese neural network (SNN), the convolutional SNN generating image embeddings used to derive similarity scores;
- based on the similarity scores, making a determination whether the item is authentic; and
- transmitting an indication of the determination to the client device.

* * * * *